(12) United States Patent
Basu

(10) Patent No.: US 11,336,460 B2
(45) Date of Patent: May 17, 2022

(54) METHOD FOR VERIFYING THE DISPLAY OF A CONTENT ITEM BY A DIGITAL DISPLAY DEVICE, AND DIGITAL DISPLAY SYSTEM

(71) Applicant: JCDecaux SA, Neuilly sur Seine (FR)

(72) Inventor: Anirvan Basu, Paris (FR)

(73) Assignee: JCDecaux SA, Neuilly sur Seine (FR)

( * ) Notice: Subject to any disclaimer, the term of this patent is extended or adjusted under 35 U.S.C. 154(b) by 245 days.

(21) Appl. No.: 16/700,303

(22) Filed: Dec. 2, 2019

(65) Prior Publication Data

US 2020/0195443 A1  Jun. 18, 2020

(51) Int. Cl.
*H04L 29/06* (2006.01)
*H04L 9/32* (2006.01)
*H04L 9/06* (2006.01)
*H04N 7/14* (2006.01)

(52) U.S. Cl.
CPC .......... *H04L 9/3247* (2013.01); *H04L 9/0637* (2013.01); *H04L 9/3213* (2013.01); *H04N 7/14* (2013.01); *H04L 2209/38* (2013.01)

(58) Field of Classification Search
CPC ... H04L 9/3247; H04L 9/0637; H04L 9/3213; H04L 2209/38; H04N 7/14
See application file for complete search history.

(56) References Cited

U.S. PATENT DOCUMENTS 9,197,867 B1 * 11/2015 Scalisi ................. H04M 11/025
9,251,343 B1 *  2/2016 Vincent ................. G06F 21/566
2002/0190972 A1 * 12/2002 Ven de Van ............... G09F 9/30
                                                                345/204
2003/0091233 A1 *  5/2003 Lapstun ................. B43K 24/06
                                                                382/187
2011/0317022 A1 * 12/2011 Cao ..................... H04N 5/23206
                                                                348/207.11
2012/0004958 A1 *  1/2012 Bloom ............... G06Q 30/0241
                                                                705/14.4
2013/0258042 A1 * 10/2013 Shun ....................... H04L 67/22
                                                                348/14.08

(Continued)

FOREIGN PATENT DOCUMENTS

EP         2509332 A1    10/2012
WO          134610 A1    10/2012

OTHER PUBLICATIONS

French Search Report Application No. FR 18 72985 reported on Sep. 30, 2019.

(Continued)

*Primary Examiner* — Ghodrat Jamshidi
(74) *Attorney, Agent, or Firm* — von Briesen & Roper, s.c.

(57) ABSTRACT

Method for verifying a content item displayed by a digital display device comprising a central unit and a digital screen controlled by the central unit. A signature is calculated automatically based on snapshots of the content item that are captured at the display device, and this signature is transmitted to a remote server that compares this signature with a similar signature calculated based on a scheduled content item expected to be displayed on the digital screen and, if the signature of the displayed content item corresponds to the signature of the scheduled content item, a token authenticating the displayed content item is generated.

24 Claims, 3 Drawing Sheets

(56) References Cited

U.S. PATENT DOCUMENTS

| | | | | |
|---|---|---|---|---|
| 2015/0086172 A1* | 3/2015 | Pajouh | ............... | G11B 27/36 |
| | | | | 386/201 |
| 2015/0199731 A1* | 7/2015 | Jevtic | ............ | G06Q 30/0277 |
| | | | | 705/14.73 |
| 2015/0317123 A1* | 11/2015 | Wu | .................. | H04M 3/567 |
| | | | | 715/727 |
| 2016/0127288 A1* | 5/2016 | Yerli | ............... | H04L 12/1818 |
| | | | | 709/206 |
| 2016/0147959 A1* | 5/2016 | Mariottini | .......... | G16H 50/20 |
| | | | | 706/46 |
| 2018/0139253 A1* | 5/2018 | Ruetschi | ............. | G06F 40/58 |
| 2020/0312063 A1* | 10/2020 | Balakrishnan | ..... | G07C 5/008 |

OTHER PUBLICATIONS

Takashi Suzuki et al: "A System for End-to-End Authentication of Adaptive Multimedia Content", In: "Communications and Multimedia Security", Jan. 1, 2005 (Jan. 1, 2005), Springer-Verlag, New York, XP055336188, ISBN: 978-0-387-24485-3 vol. 175, pp. 237-249, DOI: 10.1007/0-38724486-7_18, Section 4.

Chinese Office Action issued in corresponding Chines Patent Application No. 201911281429.1; report dated Aug. 18, 2021.

* cited by examiner

METHOD FOR VERIFYING THE DISPLAY OF A CONTENT ITEM BY A DIGITAL DISPLAY DEVICE, AND DIGITAL DISPLAY SYSTEM

CROSS-REFERENCE TO RELATED APPLICATION

This application claims priority under the Paris Convention to French Patent Application No. 18 72985 filed on Dec. 14, 2018.

FIELD OF THE DISCLOSURE

TECHNICAL FIELD

The present description relates to methods for verifying the display of a content item by a digital display device and to digital display systems.

BACKGROUND OF THE DISCLOSURE

Document WO03052734 describes a method for transmitting a coded message using a digital display device, in order to verify the content item displayed by the display device. The message is representative of the displayed content item.

SUMMARY OF THE DISCLOSURE

The present description aims in particular to propose a method for verifying the display of a content item by a digital display device, which provides solid proof that the content item has effectively been displayed.

To this end, the present description proposes a method for verifying the display of a content item by at least one digital display device,
said digital display device comprising a central unit, a digital screen controlled by the central unit,
the method comprising at least the following steps:
  (a) using said central unit to display the content item on the digital screen,
  (b) capturing at least one snapshot of at least one portion of the content item during at least one predetermined timeslot while said content item is displayed by said digital screen,
  (c) automatically calculating, using a local processor close to the digital screen, at least one first signature (encryption function) of the snapshot captured during said at least one predetermined timeslot,
  (d) transmitting content authentication data dependent on said at least one first signature, with a timestamp, to at least one remote server,
  (e) comparing at least one content authentication signature, dependent on the content authentication data, with at least one content reference signature that is calculated in the same way as the content authentication signature but based on a scheduled content item expected to be displayed on said digital screen during said at least one predetermined timeslot,
  (f) and, if said content authentication signature corresponds to the content reference signature of said scheduled content item, generating at least one authentication token authenticating the displayed content item.

By virtue of these provisions, as the signature is calculated automatically and as close as possible to the display, it is very difficult to forge said signature, such that the method provides strong proof, created at the source and not able to be forged thereafter, of the effective display of the scheduled content item. In addition, as the signature represents a low volume of data, the method consumes little bandwidth when transmitting the authentication data to the remote server. As the signature is calculated simply on one or more snapshots, calculation thereof is moreover lightweight and fast.

The method moreover does not require modifying the content item by adding coded portions thereto or masking a portion of the content item by way of any optical sensors in order to capture the snapshot or snapshots. In the case of using optical sensors, the method is robust to any image distortions or any introduction of noise into the captured signals.

In various embodiments of the method, there is furthermore the potential to adopt one and/or another of the following provisions (on their own or in any of their mutual combinations):
  said at least one timeslot corresponds to a total content duration of between 500 ms and 5 s;
  in step (f), said authentication token is integrated into a cryptographically secure blockchain
  this blockchain makes the proof of display (the authentication tokens) forgery-proof and non-duplicatable;
  in step (d), said authentication data are streamed;
  said at least one first signature is calculated using an LSH (locality sensitive hashing) encryption function;
  the content authentication data and the content authentication signature correspond to the first signature;
  in step (c), a plurality of first signatures are calculated for each content item, the content authentication data transmitted in step (d) comprise the first content signatures, and the content authentication signature used in step (e) is a second signature calculated based on said first signatures of the same content item;
  in step (c), a plurality of first signatures are calculated for each content item, and then a second signature is calculated based on said first signatures of the same content item, the content authentication data comprise the second signature, and the content authentication signature is said second signature,
  the second signature is calculated based on the first signatures of the same content item using a Merkle tree;
  the content items are grouped into campaigns and a campaign authentication signature is calculated for a given campaign based on the respective content authentication signatures of the content items assigned to said campaign, using a Merkle tree;
  the campaigns are assigned to clients and a client signature is calculated for a given client based on the respective campaign authentication signatures of campaigns assigned to said client, using a Merkle tree;
  said client signature is calculated using an LSH (locality sensitive hashing) encryption function;
  in step (d), additional data are transmitted to said at least one remote server and, in step (e), the authentication token is calculated with a value depending both on the authentication data and on the additional data;
  said digital display device furthermore comprises at least one optical sensor designed to detect a light signal emitted by at least one portion of the digital screen, and in step (b), said at least one optical sensor is used to capture a light signal emitted by at least one portion of said digital screen during said at least one predetermined timeslot, the captured optical signal constituting said captured snapshot;

the digital display device comprises a plurality of optical sensors, and said optical sensors are controlled so as to capture said optical signals synchronously, respectively using said optical sensors in step (b);

the digital display device comprises a plurality of optical sensors and:

in step (b), the optical sensors are respectively used to capture the light signals emitted by said digital screen during said at least one predetermined timeslot while said content item is displayed by said digital screen, in step (c), the respective first signatures of the light signals captured by the optical sensors during said at least one timeslot are calculated;

the method uses a plurality of predetermined timeslots for each displayed content item and, in step (b), said at least one optical sensor is used to capture the light signals emitted by said digital screen during said predetermined timeslots while said content item is displayed by said digital screen, in step (b), the respective first signatures of the light signals captured by said at least one optical sensor during said at least one timeslot are calculated;

said at least one optical sensor is designed to take at least one image of the content item displayed by the digital screen, and said captured signal is said at least one image;

before calculating the first signature, aberrations and degradations of the light signal are corrected by a local processor close to the digital screen (the processor that calculates the first signature or another local processor);

said optical sensor is configured so as to take a series of images of the content item displayed by the digital screen, and said captured signal is formed by said series of images;

said at least one optical sensor comprises a camera;

each timeslot has a duration of less than 10 s, for example of between 5 s and 10 s;

in step (d), additional data relating for example to a broadcast quality of said digital screen and/or to external conditions and/or to audience criteria are transmitted to said at least one remote server and, in step (e), an authentication token is calculated with a value depending both on the authentication data and on the additional data;

the value of the authentication token is representative of a monetary value.

Moreover, the present description also relates to a digital display system having:

a digital display device comprising a central unit and a digital screen controlled by the central unit, at least one remote server, said central unit of the digital display device being configured so as to:

(a) display the content item on the digital screen, (b) capture at least one snapshot of at least one portion of the content item during at least one predetermined timeslot while said content item is displayed by said digital screen, (d) transmit content authentication data dependent on at least one first signature, with a timestamp, to said at least one remote server, said first signature being calculated automatically by a local processor close to the digital screen based on a light signal captured by said at least one optical sensor during said at least one predetermined timeslot, said at least one remote server being configured so as to compare at least one content authentication signature, dependent on the content authentication data, with at least one content reference signature that is calculated in the same way as the content authentication signature but based on a scheduled content item expected to be displayed on said digital screen during said at least one predetermined timeslot, and said at least one remote server being configured so as, if said content authentication signature corresponds to the content reference signature of said scheduled content item, to generate at least one authentication token authenticating the displayed content item.

In various embodiments of the system, there is furthermore the potential to adopt one and/or another of the following provisions (on their own or in any of their mutual combinations):

said at least one server is configured so as to store said authentication token in a cryptographically secure blockchain;

said at least one timeslot corresponds to a total content duration of between 500 ms and 5 s;

the digital display device furthermore comprises at least one optical sensor designed to detect a light signal emitted by at least one portion of the digital screen, said central unit of the digital display device being configured so as to:

(b) use said at least one optical sensor to capture a light signal emitted by at least one portion of said digital screen during at least one predetermined timeslot while said content item is displayed by said digital screen, the captured optical signal constituting said captured snapshot;

the content item is sent to the digital screen in the form of video data, said central unit of the digital display device being configured so as to: (b) capture said snapshot by capturing said video data corresponding to said at least one predetermined timeslot;

said central unit is configured so as to stream said content authentication data;

said central unit is configured so as to calculate said at least one first signature using an LSH (locality sensitive hashing) encryption function;

the digital display device comprises a plurality of optical sensors controlled by said central unit so as to capture said optical signals synchronously;

the digital display device comprises a plurality of optical sensors and said central unit is designed to:

use the optical sensors to respectively capture light signals emitted by said digital screen during said at least one predetermined timeslot while said content item is displayed by said digital screen, calculate the respective first signatures of the light signals captured by the optical sensors during said at least one predetermined timeslot;

the method uses a plurality of predetermined timeslots for each displayed content item, and said central unit is configured so as to:

use said at least one optical sensor to capture light signals emitted by said digital screen during said predetermined timeslots while said content item is displayed by said digital screen, calculate the respective signatures of the light signals captured by said at least one optical sensor during said at least one predetermined timeslot;

said at least one optical sensor is designed to take at least one image of the content item displayed by the digital screen, and said captured signal is said at least one image;

said optical sensor is configured so as to take a series of images of the content item displayed by the digital screen, and said captured signal is formed by said series of images;

said at least one optical sensor comprises a camera;

said central unit is configured so as to transmit additional data relating for example to a broadcast quality of said digital screen and/or to external conditions and/or to audience criteria to said at least one remote server, and said at least one server is configured so as to calculate the authentication token with a value depending both on the authentication data and on the additional data;

the value of the authentication token is representative of a monetary value;

said at least one optical sensor is positioned laterally with respect to the digital screen, so as not to cover the content item displayed by the digital screen;

More generally, the system may be designed to implement each of the method functionalities described above independently or in combination.

BRIEF DESCRIPTION OF THE DRAWINGS

Other features and advantages will become apparent from the following description of one of the embodiments thereof, given by way of non-limiting example and with reference to the attached drawings.

In the drawings.

DETAILED DESCRIPTION OF THE DISCLOSURE

The same references denote identical or similar elements throughout the various figures.

Figure 1:
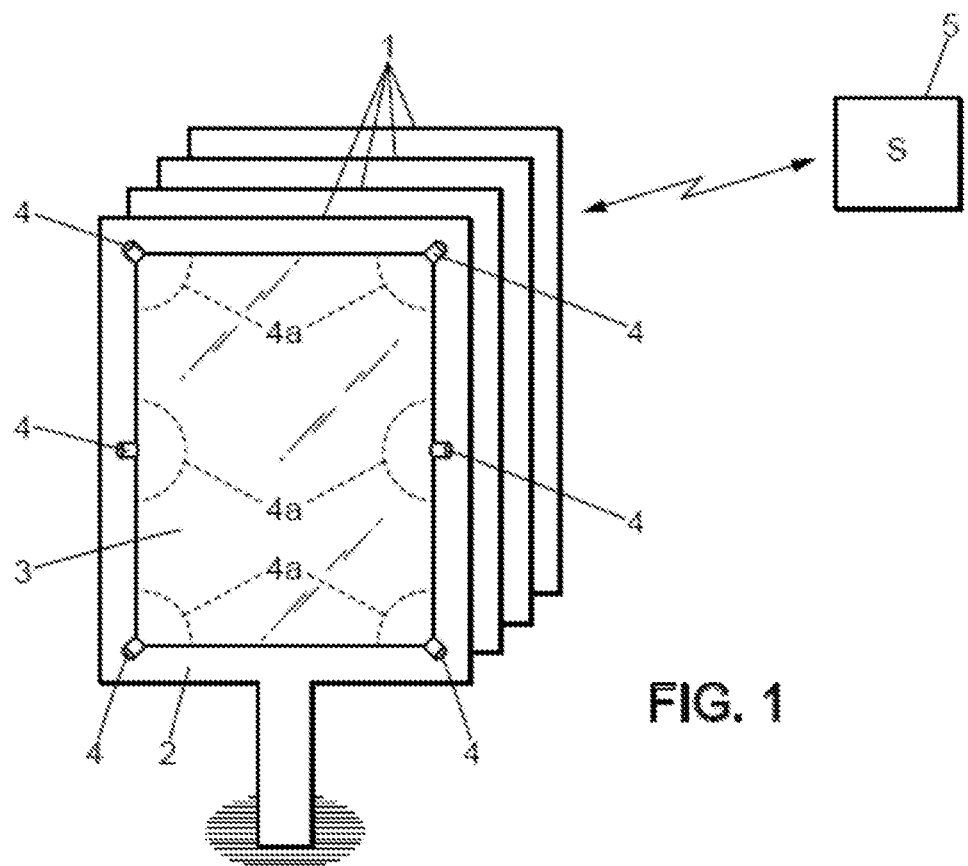
FIG. 1 is a partial schematic view of a digital display system.

FIG. 1 shows a digital display system (digital) having:

at least one digital display device 1 (generally a plurality of digital display devices 1), at least one remote server 5 (S).

The expression "at least one remote server" denotes either a single physical or virtual server or a plurality of physical or virtual servers belonging, where applicable, to a cloud computer system.

Figure 2:
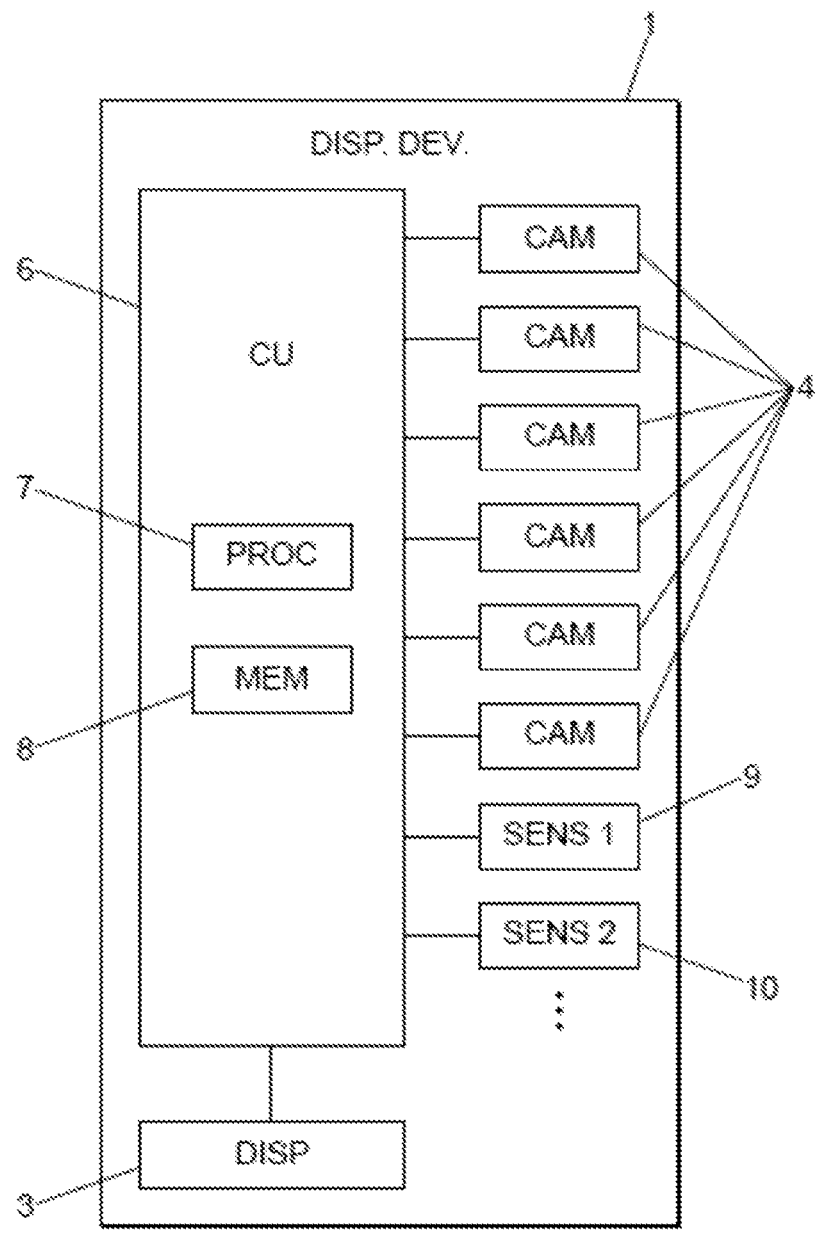
FIG. 2 is a block diagram representing certain components of a digital display device of the system of FIG. 1.

Each digital display device 1 (DISP DEV) may in particular comprise (see FIGS. 1 and 2):

a casing 2, a central unit 6 (CU) such as a computer or the like, generally positioned in the casing 2, a digital screen 3 (DISP) borne by the casing 2 and controlled by the central unit 6, possibly one or more optical sensors 4 (CAM), such as in particular digital cameras, communicating with the central unit 6 and each designed to detect a light signal emitted by at least one portion of the digital screen 3, possibly one or more additional sensors 9, 10 (SENS1, SENS2) communicating with the central unit 6.

The additional sensors 9, 10 may be present in any number and designed in particular to detect:

external conditions such as brightness, temperature, features of the audience (in particular number of people and/or movements of people and/or features of people such as in particular age and gender, and/or mood or behaviour of the people—in this case, the external sensor or sensors may be chosen in particular from among cameras, Wi-Fi detectors or Bluetooth®, etc.), a broadcast quality of images broadcast by the digital screen 3 (including in particular operation of the digital screen 3, definition of the image, etc.).

The additional sensors 9, 10 may be present in any number and may possibly communicate with the central unit 6 via a short-range radio network, in Internet of Things (IoT) mode. The optical sensors may communicate with the central unit 6 in a wired manner, but could where applicable communicate with the central unit 6 via a short-range radio network, in Internet of Things (IoT) mode.

Each optical sensor 4 is positioned laterally with respect to the digital screen 3, so as not to cover the content item displayed by the digital screen 3. It takes a for example partial image of the content item displayed by the digital screen 3, represented by the respective areas 4a of the optical sensors 4 in FIG. 1.

The central unit 6 may have at least one processor 7 (PROC) and at least one memory 8 (MEM). In the following text, the digital processing operations (image correction, first signature calculation, possibly second signature calculation) are performed essentially by the processor 7 of the central unit 6, but some processing operations could more generally be performed by any local processor close to the digital screen 3, for example processors integrated into the sensors 4 and/or 9, 10.

The central unit 6 is configured so as to display content items, for example videos or other content items, on the digital screen 3. The content items may for example be displayed for example sequentially, following a given list (playlist). The content items and, where applicable, the lists (playlists) may be received from the at least one server 5 or from other servers.

The central unit 6 is configured so as to use each optical sensor 4 to capture a light signal emitted by the corresponding area 4a of said digital screen during at least one predetermined timeslot t1 or possibly during a plurality of timeslots t1, t2, etc. while said content item is displayed by said digital screen.

Advantageously, when there are a plurality of optical sensors 4, the central unit 6 controls the various optical sensors 4 so as to capture said optical signals synchronously. When there are one or more additional sensors 9, 10, the central unit 6 is also able to control them so as to perform capturing synchronously with one another and/or synchronously with the optical sensor or sensors 4.

Each timeslot may have a duration of less than 10 s, for example from 5 to 10 s. When the optical sensor 4 is a camera, the captured light signal is thus a short video (sequence of images) forming a snapshot (that is to say an instantaneous shot) of the content item.

Each snapshot may possibly be reduced to one image (frame) of the video and, in this case, each timeslot may be reduced to the duration of one image of the video. The duration of an image (display duration of an image of the content item) may for example be 30 ms or less.

The snapshots may be distributed over the duration of the content item, so as to sample the content item. There may for example be a number of 20 snapshots per content item, or more generally a number of 10 to 30 snapshots per content item.

Said at least one timeslot may correspond to a total content duration (sum of the display durations of the snapshots of one and the same content item, originating from the same optical sensor if optical sensors are used) of between 500 ms and 5 s.

Figure 3:
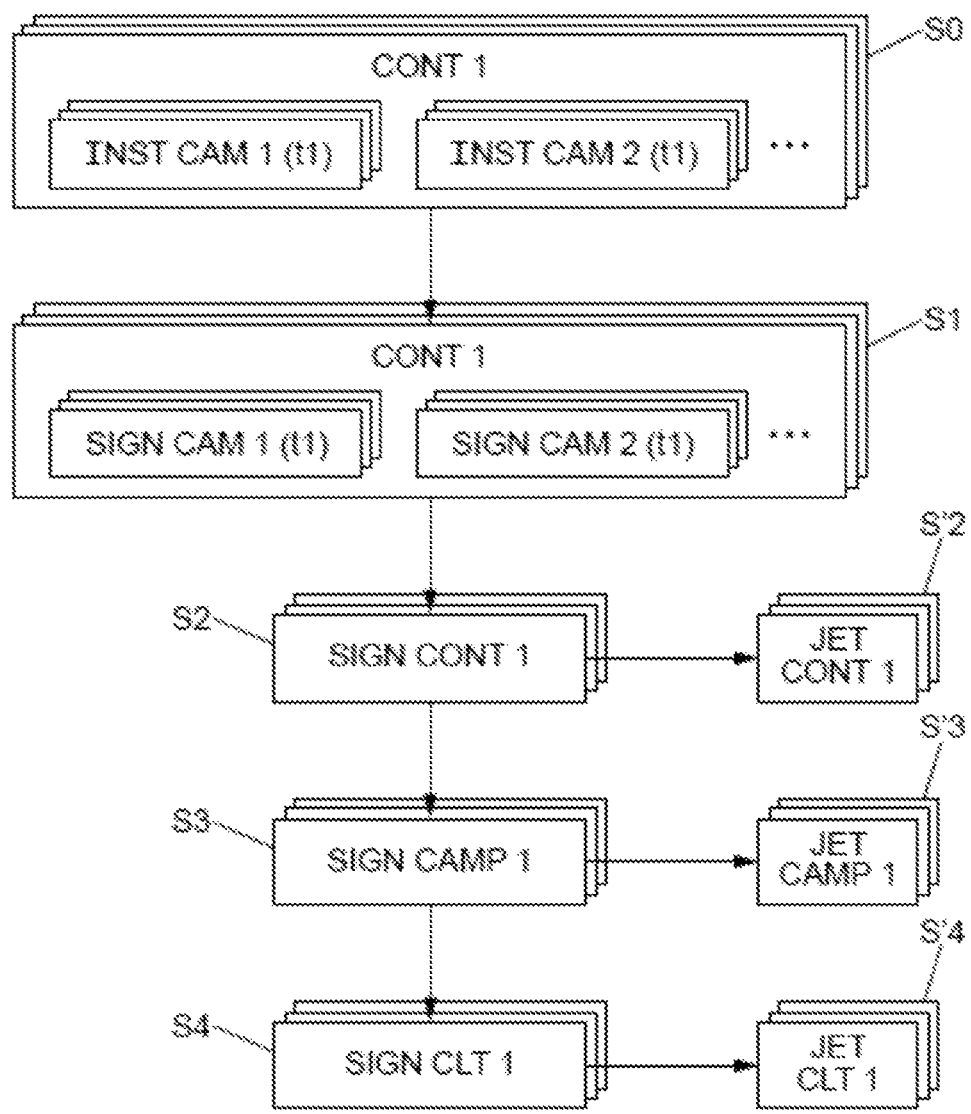
FIG. 3 is a diagram illustrating certain data processing steps in the system of FIG. 1.

In this step (S0 in FIG. 3), the central unit 6, for each content item (for example the content item CONT 1), stores snapshots INST CAM 1, INST CAM 2, etc. taken by the various optical sensors 4 over the timeslot or timeslots t1, t2, etc. corresponding to this content item.

The snapshots may advantageously be subjected to image processing in step S0, so as to compensate distortion and noise introduced by the fact that the optical sensors 4 are generally greatly inclined with respect to the surface of the digital screen. This image processing, which is known per se, may in particular use a Kalman filter. The image processing in step S0 may be performed by the central unit 6, or in a processor specific to each optical sensor 4, or in any other local processor close to the digital screen 3.

The central unit 6 is configured so as to automatically calculate a first signature (step S1 in FIG. 3) of each snapshot corresponding to each content item (for example for the content item CONT 1, a first signature SIGN CAM 1(t1) for the snapshot originating from the optical sensor CAM 1 at the timeslot t1, a first signature SIGN CAM 2(t1) for the snapshot originating from the optical sensor CAM 2 at the timeslot t1, etc.).

The first signature may be an encryption (hash) function, in particular of LSH (locality sensitive hashing) type.

In step S2, the central unit 6 determines a second signature (SIGN CONT 1) based on all of the first signatures corresponding to one and the same content item. In the specific case in which one or more digital screens 3 were to be equipped with a single optical sensor 4 and to take a single snapshot (over a single timeslot) per content item, the second signature has no reason to be calculated and the signature comparisons explained below would be performed directly based on the first signature of each content item.

The second signature and the first signatures advantageously form a hierarchical data structure in the form of a Merkle tree.

The second signature may be an encryption (hash) function, in particular of LSH (locality sensitive hashing) type.

It will be noted that the first signatures and/or the second signature may be calculated by a processor other than the processor 7 of the central unit 6. For example, each first signature could be calculated by a processor internal to each optical sensor 4 or assigned to each optical sensor 4, and the second signature could be calculated by the central unit 6 based on the first signatures received from these processors.

In step S2, the central unit 6 transmits the second signature (or more generally content authentication data dependent on the first signatures), with a timestamp, to said at least one remote server 5. The central unit 6 may be configured so as to stream said content authentication data to said at least one server 5. This transmission takes the form of a series of alphanumeric messages each representing a low volume of data, not containing the snapshots themselves.

In practice, the content authentication data may be or comprise the second signature of each content item.

It will be noted that the content authentication data could also be transmitted to said at least one server 5 in step S1, in which case said content authentication data are or comprise the first signatures. In this case, the second signature may possibly be calculated by the at least one server 5 in the same way as described above, or else the at least one server 5 does not calculate a second signature and directly uses the first signature or signatures to authenticate the displayed content item (for example, but not exclusively in the abovementioned case of a single first signature per content item).

In any case, the server has at least one content authentication signature (first signature(s) or second signature) of each content occurrence, played on each digital screen 3.

In step S'2, said at least one remote server 5 compares said at least one authentication signature of each content occurrence with a scheduled content item expected to be displayed on the digital screen 3 during each timeslot corresponding to said content occurrence played on the digital screen 3.

More precisely, the at least one server 5 compares each content authentication signature with a reference signature calculated based on the scheduled content item. To this end, said at least one server 5:

for each content item, simulates the recording of the snapshots corresponding to the various optical sensors during timeslots corresponding to the timeslots at which the snapshots are actually captured by the optical sensors (in other words, the simulated snapshots thus obtained corresponding to the same images of the content item as the snapshots captured by the optical sensors, after image processing of these captured snapshots), for each content item, calculates the reference signature or signatures in the same way as the abovementioned authentication signature or signatures of this content item is or are calculated, compares each content authentication signature with the reference signature of the scheduled content item.

If this comparison indicates that the authentication signature or signatures is/are identical to the reference signature or signatures, the at least one server 5 deduces from this that the content item displayed on the digital screen 3 corresponds to said scheduled content item, and said server 5 generates an unalterable authentication token JET CONT 1 authenticating the displayed content item (CONT 1 in this example).

Said at least one server 5 may be configured so as to store said token JET CONT 1 in a cryptographically secure blockchain.

The various content items are generally grouped into campaigns, and said at least one server 5 may be configured so as to calculate, for a given campaign (for example CAMP 1), a third signature, called campaign signature, based on the content authentication data corresponding to each content item assigned to said campaign, in particular based on the respective second signatures of the content items assigned to said campaign CAMP 1 (step S3). Said third signature may also be calculated using an LSH (locality sensitive hashing) encryption function. The first, second and third signatures may form a data structure in the form of a Merkle tree. Through comparison with the data from said at least one server 5 regarding the content items expected for the campaign CAMP 1, said at least one server 5 is able to determine an unalterable authentication token JET CAMP 1 for each campaign CAMP 1 (step S'3). Said at least one server 5 may be configured so as to store said token JET CAMP 1 in said cryptographically secure blockchain.

The campaigns are assigned to clients, and said at least one server 5 may be configured so as to calculate a fourth signature, called client signature, for a given client CLT 1 based on the respective third signatures of campaigns CAMP 1, CAMP 2, etc. assigned to said client CLT 1 (step S4). Said fourth signature may also be calculated using an LSH (locality sensitive hashing) encryption function. The first, second, third and fourth signatures may form a data structure in the form of a Merkle tree. Through comparison with the data from said at least one server 5 regarding the content items expected for the campaigns CAMP 1, CAMP 2, etc. of the client CLT 1, said at least one server 5 is able to determine an unalterable authentication token JET CLT 1 relating to the client CLT 1 (step S'4). Said at least one server 5 may be configured so as to store said token JET CLT 1 in said cryptographically secure blockchain.

The authentication tokens thus make it possible to reliably authenticate, for clients who wished to broadcast their content items on digital display devices 1, that these content items have effectively been displayed.

Moreover, the central unit 6 may furthermore be configured so as to transmit additional data originating in particular from the abovementioned additional sensors 9, 10 and/or external data such as data originating from social networks (relevant data for qualifying or quantifying the audience or other external conditions) to said at least one remote server 5. The content authentication tokens (JET CONT 1, JET CONT 2, etc.) may then be calculated by said at least one server 5 with a value depending both on the content authentication data (in particular first or second signature(s)) and on said additional data. In particular, the value of the authentication token or a portion of said token may be representative of a monetary value of each content broadcast by a digital display device 1, in particular reflecting the audience reached and/or the broadcast quality. This provision may make it possible to invoice each content broadcast separately. This invoicing may possibly be automatic, the tokens being able to be used for example as virtual currency in the abovementioned blockchain.

More generally, this provision may make it possible not only to provide proof that a given content item has been displayed on the digital screen 3, but also, where applicable, to provide proof of the external conditions at the time of the display and/or of the audience present at the time of the display.

As a variant, it is possible to dispense with optical sensors. In this case, rather than capturing an optical signal emitted by the digital screen 3, the central unit 6, in abovementioned step (b), captures one or more snapshots of at least one portion of the video data sent to the digital screen during the display of the content item. This capturing may be performed for example in the graphics card of the central unit 6, which drives the digital screen 3. Everything that has been explained above with regard to the duration and the number of snapshots and with regard to the signatures and the process following the signatures continues to apply in this variant.

In any case, the cumulative duration of the timeslot or timeslots of the snapshot or snapshots corresponding to one and the same content item preferably does not exceed 20% of the total duration of the content item (display duration of the content item each time it appears on the digital screen 3).

The invention claimed is:

1. Method for verifying the display of a content item by at least one digital display device,
said digital display device comprising a central unit and a digital screen controlled by the central unit,
the method comprising at least the following steps:
(a) using said central unit to display the content item on the digital screen,
(b) capturing at least one snapshot of at least one portion of the content item during at least one predetermined timeslot while said content item is displayed by said digital screen,
(c) automatically calculating, using a local processor, at least one first signature of the snapshot captured during said at least one predetermined timeslot,
(d) transmitting content authentication data dependent on said at least one first signature, with a timestamp, to at least one remote server,
(e) comparing at least one content authentication signature, dependent on the content authentication data, with at least one content reference signature that is calculated in the same way as the content authentication signature but based on a scheduled content item expected to be displayed on said digital screen during said at least one predetermined timeslot,
(f) if said content authentication signature corresponds to the content reference signature of said scheduled content item, generating at least one authentication token authenticating the displayed content item.

2. Method according to claim 1, wherein said at least one timeslot corresponds to a total content duration of between 500 ms and 5 s.

3. Method according to claim 1, wherein, in step (f), said authentication token is integrated into a cryptographically secure blockchain.

4. Method according to claim 1, wherein, in step (d), said authentication data are streamed.

5. Method according to claim 1, wherein said at least one first signature is calculated using Lacality Sensitive Hashing encryption function.

6. Method according to claim 1, wherein the content authentication data and the content authentication signature correspond to the first signature.

7. Method according to claim 1, wherein:
in step (c), a plurality of first signatures are calculated for each content item,
the content authentication data transmitted in step (d) comprise the first signatures of the content item,
and the content authentication signature used in step (e) is a second signature calculated based on said first signatures of the same content item.

8. Method according to claim 1, wherein:
in step (c), a plurality of first signatures are calculated for each content Hem, and then a second signature is calculated based on said first signatures of the same content item,
the content authentication data comprise the second signature,
and the content authentication signature is said second signature.

9. Method according to claim 7, wherein:
in step (c), a plurality of first signatures are calculated for each content item,
the content authentication data transmitted in step (d) comprise the first signatures of the content item,
the content authentication signature used in step (e) is a second signature calculated, based on said first signatures of the same content item,
and the second signature is calculated based on the first signatures of the same content item using a Merkle tree.

10. Method according to claim 1, wherein the content items are grouped into campaigns and a campaign authentication signature is calculated for a given campaign based on the respective content authentication signatures of the content items assigned to said campaign, using a Merkle tree.

11. Method according to claim 10, wherein the campaigns are assigned to clients and a client signature is calculated for a given client based on the respective campaign authentication signatures of campaigns assigned to said client, using a Merkle tree.

12. Method according to claim 1, wherein, in step (d), additional data are transmitted to said at least one remote server and, in step (2), the authentication token is calculated with a value depending both on the authentication data and on the additional data.

13. Method according to claim 1, wherein said digital display device furthermore comprises at least one optical sensor designed to detect a light signal emitted by at least one portion of the digital screen,
and in step (b), said at least one optical sensor is used to capture a light signal emitted by at least one portion of said digital screen during said at least one predetermined timeslot, the captured optical signal constituting said captured snapshot.

14. Method according to claim 13, wherein the digital display device comprises a plurality of optical sensors, and said optical sensors are controlled so as to capture said optical signals synchronously, respectively using said optical sensors in step (b).

15. Method according to claim 13, wherein the digital display device comprises a plurality of optical sensors and:
in step (b), the optical sensors are respectively used to capture the light signals emitted by said digital screen during said at least one predetermined timeslot while said content item is displayed by said digital screen,
in step (c), the respective first signatures of the light signals captured by the optical sensors during said at least one predetermined timeslot are calculated.

16. Method according to claim 13, wherein a plurality of predetermined timeslots are used for each displayed content item and:
in step (b), said at least one optical sensor is used to capture the light signals emitted by said digital screen during said predetermined timeslots while said content item is displayed by said digital screen,
in step (c), the respective first signatures of the light signals captured by said at least one optical sensor during said at least one timeslot are calculated.

17. Method according to claim 13, wherein said at least one optical sensor is designed to take at least one image of the content item displayed by the digital screen, and said captured signal is said at least one image.

18. Method according to claim 13, wherein, before calculating the first signature, aberrations and degradations of the light signal are corrected by a local processor.

19. Method according to claim 1, wherein, in step (a), the content item is displayed on the digital screen by sending video data to said digital screen and, in step (b), said snapshot is captured by capturing said video data corresponding to said at least one predetermined timeslots.

20. Method according to claim 1, wherein, in step (a), the content item is displayed for a certain duration on the digital screen and, in step (b), said at least one timeslot has a total duration that does not exceed 20% of the duration during which the content item is displayed on the digital screen.

21. Digital display system having:
a digital display device comprising a central unit and a digital screen controlled by the central unit,
at least one remote server,
said central unit of the digital display device being configured so as to:
(a) display the content item on the digital screen,
(b) capture at least one snapshot of at least one portion of the content item during at least one predetermined timeslot while said content item is displayed by said digital screen,
(d) transmit content authentication data dependent on at least one first signature, with a timestamp, to said at least one remote server, said first signature being calculated automatically by a local processor based on a light signal captured during said at least one predetermined timeslot,
said at least one remote server being configured so as to compare at least one content authentication signature, dependent on the content authentication data, with at least one content reference signature that is calculated in the same way as the content authentication signature but based on a scheduled content item expected to be displayed on said digital screen during said at least one predetermined timeslot, and said at least one remote server being configured so as, if said content authentication signature corresponds to the content reference signature of said scheduled content item, to generate at least one authentication token authenticating the displayed content item.

22. System according to claim 21, wherein said at least one timeslot corresponds to a total content duration of between 500 ms and 5 s.

23. System according to claim 21, wherein the digital display device furthermore comprises at least one optical sensor designed to detect a light signal emitted by at least one portion of the digital screen,
said central unit of the digital display device being configured so as to:
(b) use said at least one optical sensor to capture a light signal emitted by at least one portion of said digital screen during at least one predetermined timeslot while said content item is displayed by said digital screen, the captured optical signal constituting said captured snapshot.

24. System according to claim 21, wherein the content item is sent to the digital screen in the form of video data, said central unit of the digital display device being configured so as to: (b) capture said snapshot by capturing said video data corresponding to said at least one predetermined timeslot.

* * * * *